April 12, 1949.  W. J. ROBERTS  2,467,052
CANE STRIPPER WITH SPRING PRESSED ARCUATE BLADES
Filed Nov. 27, 1944  2 Sheets-Sheet 1

Inventor
Wesley J. Roberts,
By McMorrow
Attorneys

April 12, 1949. W. J. ROBERTS 2,467,052
CANE STRIPPER WITH SPRING PRESSED ARCUATE BLADES
Filed Nov. 27, 1944 2 Sheets-Sheet 2
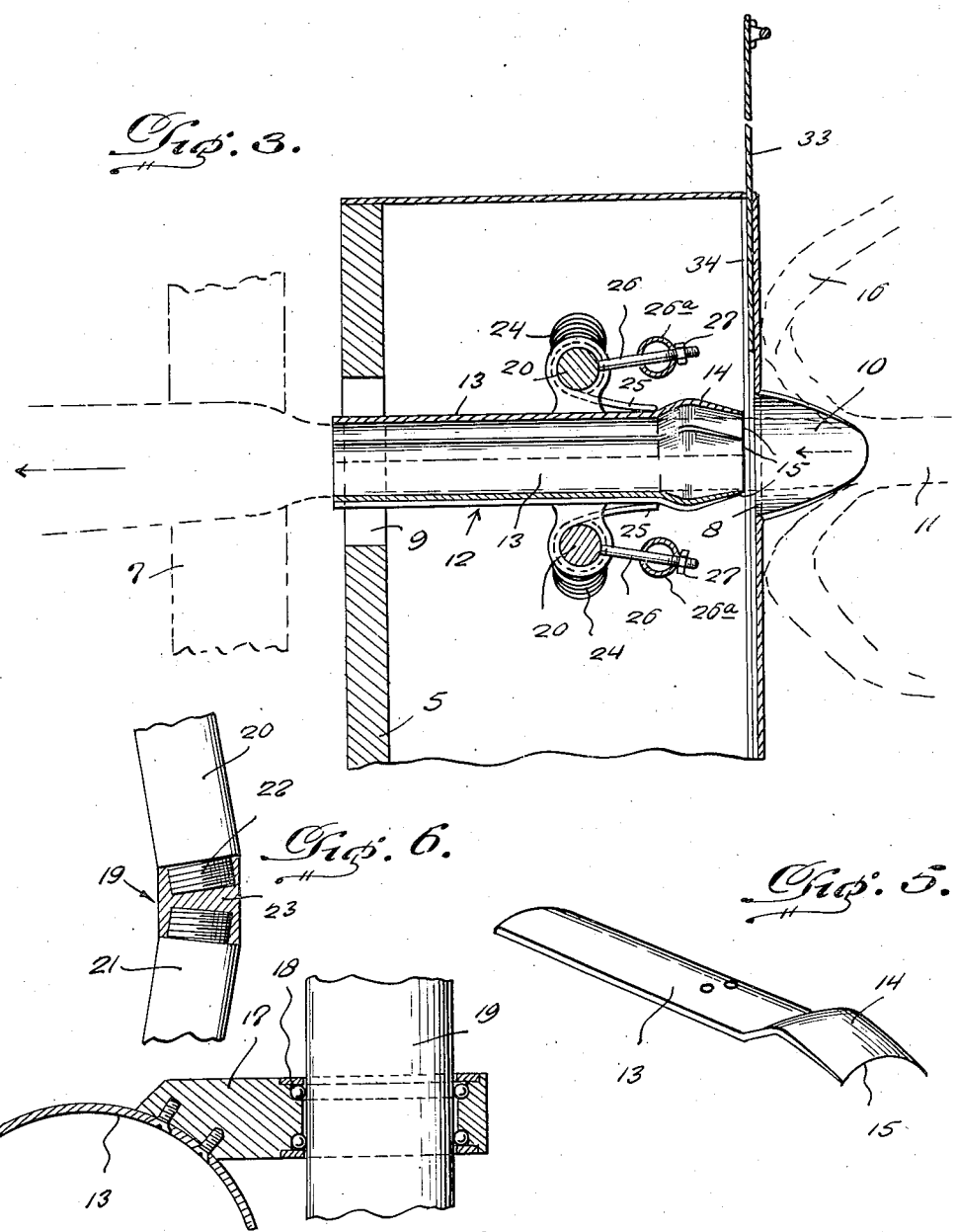
Inventor
Wesley J. Roberts,
Attorneys Patented Apr. 12, 1949

2,467,052

UNITED STATES PATENT OFFICE 2,467,052

CANE STRIPPER WITH SPRING PRESSED ARCUATE BLADES

Wesley J. Roberts, Jacksonville, Ark.

Application November 27, 1944, Serial No. 565,348

6 Claims. (Cl. 130—31)

The present invention relates to new and useful improvements in cane strippers adapted for stripping leaves from the stalks of sugar cane, and the like, and the invention has for its primary object to provide a device of this character in which the leaves are separated from the cane stalks and the cane stalks freed of their leaves are caused to be introduced between the crushing rollers of the cane mill.

An important object of the present invention is to provide a cane stripper for attachment to the cane mill, said stripper including a housing having a tubular stripper embodying a plurality of elongated overlapping arcuate blades supported in the housing for movement toward and away from each other.

A further important object of the invention is to provide a cane stripper for attachment to the cane mill, said stripper including a housing having a stripper tube embodying a plurality of elongated overlapping arcuate blades each provided with a cutting edge on its forward end supported in the housing for movement relative to each other.

A further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a horizontal sectional view taken substantially on a line 3—3 of Figure 2.

Figure 4 is an enlarged sectional view of one of the blades and slidably mounted collar attached thereto.

Figure 5 is a perspective view of one of the stripper blades, and

Figure 6 is a fragmentary detail of the connected ends of the sectional guide for the collar, and with parts broken away and shown in section.

Figure 1:
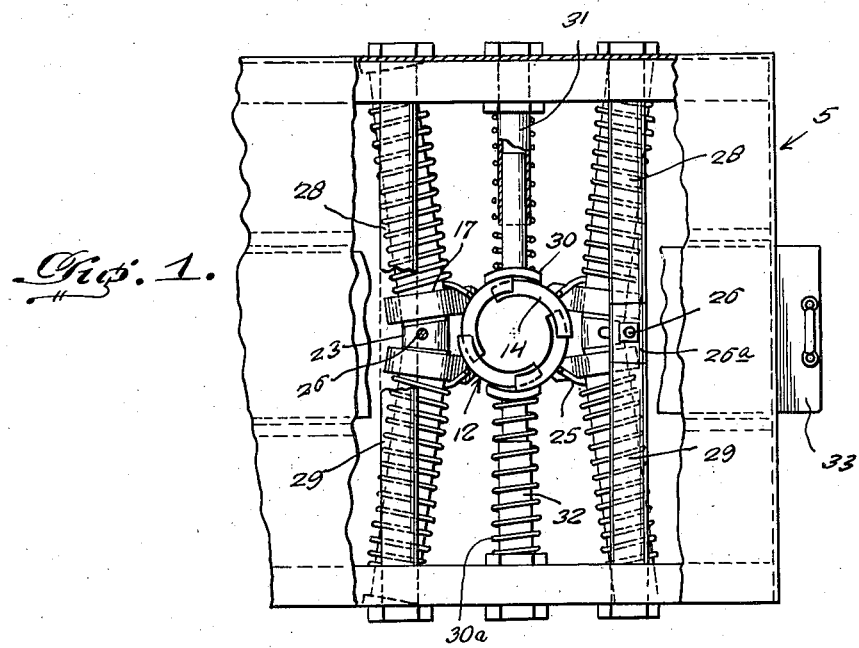
Figure 1 is a fragmentary front elevational view with parts of the stripper housing broken away and shown in section.
Figure 2:
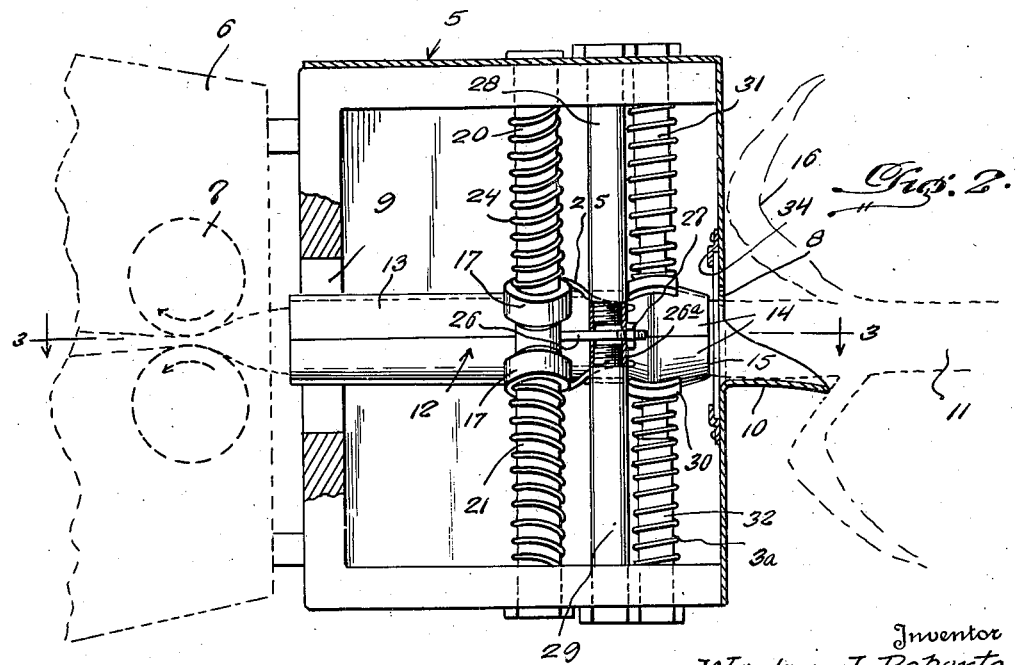
Figure 2 is a vertical sectional view.

Referring now to the drawings in detail, wherein for the purpose of illustration I have disclosed a preferred embodiment of the invention, the numeral 5 designates a housing adapted for attaching in any suitable manner to the front of a cane mill 6 and in advance of the crushing rollers 7 mounted in the mill.

The housing 5 is formed with a front opening 8 and rear opening 9 in alignment with the rollers 7, the lower edge of the front opening 8 being formed with a trough-shaped guide 10 for guiding the cane stalks 11 into the front end of a tubular expansible stripper generally designated 12.

The stripper 12 is formed of a plurality of transversely arcuate blades 13 with the longitudinal edges of adjacent blades arranged in overlapping relation with respect to adjacent blades, as indicated in Figure 1 of the drawings, the front ends of the blades being convex-concavely shaped to form an enlarged bulbous head 14 tapering forwardly, with the front edges sharpened as indicated at 15, so as to cut the leaves 16 from the sides of a stalk 11 inserted through the housing opening 8 into the head 14.

The blades 13 are held in expansible tube forming relation by means of the collars 17 attached by one edge to the backs of the blades, the collars having ball bearing assemblies 18 mounted therein for slidable engagement on rod assemblies 19 mounted in the housing 5.

The rod assemblies 19 include upper rods 20 and lower rods 21 having their adjacent ends threaded, as at 22, connectors 23, the rods 20 and 21 being oppositely and outwardly angulated from a vertical plane. The upper and lower ends of the rods are attached to the top and bottom portions respectively of the housing 5, angulation of the rods toward the stripper tube being such as to facilitate the sliding movement of the collars 17 on the rods during the expanding and contracting action of the blades 13 forming the stripper tube.

Coil springs 24 are carried by each of the rods 20 and 21 and yieldably engage the collars 17 so as to yieldably urge the blades 13 toward each other, whereby the stripper tube 12 is normally in contracted position. The ends of the springs adjacent the collars 17 have extensions 25 projecting forwardly and bearing upon the backs of the blades 13 of the stripper tube.

Bolts 26 extend forwardly from the connectors 23 and transversely through the tubular connectors 26a connecting the adjacent ends of upper and lower rods 28 and 29 located forwardly of the rod assemblies 19 and secured to the top and bottom, respectively, of the casing 5, whereby the rod assemblies 19 are braced in position.

The head 14 of the tubular stripper 12 is also yieldably maintained in contracted position by means of arcuate elements 30 on the adjacent ends of upper and lower telescoping rod assemblies 31 and 32 whose opposite ends are secured to the top and bottom, respectively, of the housing 5. Coil springs 30a mounted on the rod assemblies 31 and 32 press the elements 30 into engagement with the upper and lower sides of the head 14 of the stripper tube 12.

In the operation of the device, a stalk 11 is inserted through the casing front opening 8 into the head 14 of the stripper tube until the stalk is caught between the rollers 7 of the cane mill 6. As the stalk is drawn through the stripper tube 12 by the rollers 7 the leaves 16 of the stalk will be stripped from the stalk by the cutting edges 15 on the front end of the head 14.

By reason of the expansible construction of the stripper tube 12, stalks of various diameters are automatically accommodated by the device, it being obvious that the larger diameter stalks expand the stripper tube according to their diameters.

When the device is not in use, the front opening 8 may be closed by sliding cover 33 mounted in guides 34 on the front wall of the housing 5, the cover thereby preventing dirt and trash, as well as rain, from entering the housing 5 and injuring or clogging the stripper mechanism.

It is believed that the details of construction, manner of operation and advantages of the device will be readily understood from the foregoing without further detailed explanation.

Having thus described the invention, what I claim is:

1. A cane stripper including a housing adapted to be attached in front of a cane mill, an expansible tubular stripper mounted in the housing, a plurality of elongated overlapping arcuate blades sharpened at their forward ends comprising said tubular stripper, guide rods in said housing, collars attached to each of said blades and surrounding a guide rod, and spring means biasing each collar in a direction to contract the stripper, the forward extremities of the blades being convexed to form a bulbous head, and spring-pressed telescoping rods engaging opposite sides of said head.

2. A cane stripper comprising a housing, a stripper tube comprising more than two elongated blades having cutting edges on their forward ends, said blades being of curved transverse cross section and arranged with the longitudinal edges of adjacent blades in overlapping relation, slide collars fixed on said blades and extending laterally from said stripper tube, guide rods on said housing supporting said blades on which said slide collars are slidably mounted whereby movements of said blades relative to each other into greater or less overlapping relation are guided, spring means acting on said blades to normally maintain said blades in maximum overlapping relation in which the internal diameter of said stripper tube is at a minimum and yieldable to enable said blades to be moved to minimum overlapping relation in which the internal diameter of said stripper tube is at a maximum by passage of a maximum diameter cane stalk through said stripper tube.

3. A cane stripper comprising a housing, a stripper tube comprising more than two elongated blades having cutting edges on their forward ends, said blades being of curved transverse cross section and arranged with the longitudinal edges of adjacent blades in overlapping relation, slide collars fixed on said blades and extending laterally from said stripper tube, guide rods on said housing supporting said blades on which said slide collars are slidably mounted whereby movements of said blades relative to each other into greater or less overlapping relation are guided, spring means acting on said blades to normally maintain said blades in maximum overlapping relation in which the internal diameter of said stripper tube is at a minimum and yieldable to enable said blades to be moved to minimum overlapping relation in which the internal diameter of said stripper tube is at a maximum by passage of a maximum diameter cane stalk through said stripper tube, and additional spring means on said housing engaging portions of said blades between said slide collars and said cutting edges and acting to normally maintain the forward end of said stripper tube yieldably contracted to minimum diameter, said additional spring means being yieldable to permit the forward ends of said plates to move relative to each other so as to conformably increase the diameter of the forward end of said stripper tube when the stalk is inserted in said forward end of the stripper tube.

4. A cane stripper comprising a casing, a diametrically expansible stripper tube comprising a plurality of elongated blades of transversely curved cross section arranged with the longitudinal edges of adjacent blades in overlapping relation and having cutting edges on their forward ends, guide assemblies on said casing on opposite sides of said stripper tube comprising guide rods extending across said casing, slide collars fixed on the blades, some of said slide collars extending on one side of said stripper tube and slidably engaging the guide assembly on that side and others of said slide collars extending on the opposite side of said stripper tube and slidably engaging the guide assembly on that side, each guide assembly having spring means acting upon the slide collars associated therewith in a manner to urge the related blades toward maximum overlapping relation, whereby said stripper tube is normally yieldably contracted to its minimum internal diameter.

5. A cane stripper comprising a casing, a diametrically expansible stripper tube comprising a plurality of elongated blades of transversely curved cross section arranged with the longitudinal edges of adjacent blades in overlapping relation and having cutting edges on their forward ends, guide assemblies on said casing on opposite sides of said stripper tube comprising guide rods extending across said casing, slide collars fixed on the blades, some of said slide collars extending on one side of said stripper tube and slidably engaging the guide assembly on that side and others of said slide collars extending on the opposite side of said stripper tube and slidably engaging the guide assembly on that side, each guide assembly having spring means acting upon the slide collars associated therewith in a manner to urge the related blades toward maximum overlapping relation, whereby said stripper tube is normally yieldably contracted to its minimum internal diameter, each guide assembly comprising a plurality of guide rods with each one of which an associated blade slide collar is slidably engaged.

6. A cane stripper comprising a casing, a diametrically expansible stripper tube comprising a plurality of elongated blades of transversely curved cross section arranged with the longitudinal edges of adjacent blades in overlapping relation and having cutting edges on their forward ends, guide assemblies on said casing on opposite sides of said stripper tube comprising guide rods extending across said casing, slide collars fixed on the blades, some of said slide collars extending on one side of said stripper tube and slidably engaging the guide assembly on that side and others of said slide collars extending on the opposite side of said stripper tube and slidably engaging the guide assembly on that side, each guide assembly having spring means acting upon the slide collars associated therewith in a manner to urge the related blades toward maximum overlapping relation, whereby said stripper tube is normally yieldably contracted to its minimum internal diameter, each guide assembly comprising a plurality of guide rods with each one of which an associated blade slide collar is slidably engaged, said guide rods being angulated with respect to each other in a manner to confine movement of said blades to straight lines substantially normal to the axis of said stripper tube.

WESLEY J. ROBERTS.

REFERENCES CITED

The following references are of record in the file of this patent:

UNITED STATES PATENTS

| Number | Name | Date |
|---|---|---|
| 623,753 | Winchell | Apr. 25, 1899 |
| 646,908 | House | Apr. 3, 1900 |
| 1,172,216 | Knipp | Feb. 15, 1916 |
| 1,491,070 | Scranton | Apr. 22, 1924 |
| 1,557,113 | Scranton | Oct. 13, 1925 |
| 2,212,071 | Morral et al. | Aug. 20, 1940 |